(12) United States Patent
Fehrman et al.

(10) Patent No.: US 11,570,190 B2
(45) Date of Patent: *Jan. 31, 2023

(54) DETECTION OF SSL / TLS MALWARE BEACONS

(71) Applicant: NetSec Concepts LLC, Sturgis, SD (US)

(72) Inventors: Brian Fehrman, Sturgis, SD (US); Elizabeth Woody, Rapid City, SD (US); Joseph Lillo, Rapid City, SD (US)

(73) Assignee: NETSEC CONCEPTS LLC, Sturgis, SD (US)

( * ) Notice: Subject to any disclaimer, the term of this patent is extended or adjusted under 35 U.S.C. 154(b) by 391 days.

This patent is subject to a terminal disclaimer.

(21) Appl. No.: 16/825,103

(22) Filed: Mar. 20, 2020

(65) Prior Publication Data
US 2020/0304529 A1    Sep. 24, 2020

Related U.S. Application Data

(60) Provisional application No. 62/822,564, filed on Mar. 22, 2019.

(51) Int. Cl.
*H04L 9/40* (2022.01)

(52) U.S. Cl.
CPC ...... *H04L 63/1425* (2013.01); *H04L 63/0236* (2013.01); *H04L 63/0823* (2013.01); *H04L 63/1433* (2013.01); *H04L 63/166* (2013.01)

(58) Field of Classification Search
CPC ............ H04L 63/1425; H04L 63/0236; H04L 63/0823; H04L 63/1433; H04L 63/166; H04L 63/1416; H04L 63/145
See application file for complete search history.

(56) References Cited

U.S. PATENT DOCUMENTS

| 7,028,182 B1 * | 4/2006 | Killcommons ......... H04L 63/08 713/153 |
| 7,966,395 B1 | 6/2011 | Pope et al. |

(Continued)

FOREIGN PATENT DOCUMENTS

| WO | WO-2006094275 A2 * | 9/2006 | ............. G06F 21/55 |
| WO | WO-2019017879 A1 * | 1/2019 | ........... G06F 21/552 |

OTHER PUBLICATIONS

Non-Patent Literature Search, InnovationQ Plus, Jul. 8, 2018, 1 pages.

(Continued)

*Primary Examiner* — Sarah Su
(74) *Attorney, Agent, or Firm* — Goodhue, Coleman & Owens, P.C.

(57) ABSTRACT

A method for characterizing network traffic is provided. The method includes maintaining a database identifying a plurality of digital certificates and a number of Internet Protocol addresses associated with each of the plurality of digital certificates, capturing network traffic over a network connection at a network connected device, analyzing the network traffic by determining the digital certificates associated with Internet Protocol addresses associated with the network traffic and a number of Internet Protocol addresses associated with each of the digital certificates and updating the database, and characterizing at least one of the Internet Protocol addresses associated with one of the digital certificates based on the number of Internet Protocol addresses associated with the one of the digital certificates.

20 Claims, 5 Drawing Sheets

(56) References Cited

U.S. PATENT DOCUMENTS

| | | | | |
|---|---|---|---|---|
| 9,038,178 B1* | 5/2015 | Lin | ........................ | H04L 63/02 |
| | | | | 713/153 |
| 9,043,894 B1* | 5/2015 | Dennison | .............. | G06F 21/566 |
| | | | | 726/11 |
| 9,979,741 B2 | 5/2018 | Fehrman | | |
| 10,264,007 B2 | 4/2019 | Fehrman | | |
| 10,681,075 B2* | 6/2020 | Fehrman | ............... | H04W 12/08 |
| 2010/0162399 A1* | 6/2010 | Sheleheda | ........... | H04L 63/1416 |
| | | | | 726/24 |
| 2014/0293804 A1* | 10/2014 | Kakadia | .................. | H04L 43/12 |
| | | | | 370/252 |
| 2015/0326609 A1* | 11/2015 | Cruz Mota | ......... | H04W 12/122 |
| | | | | 726/1 |
| 2017/0187736 A1* | 6/2017 | Fehrman | ............... | H04W 12/08 |
| 2021/0194926 A1* | 6/2021 | Luo | ........................ | G06F 21/53 |

OTHER PUBLICATIONS

Non-Patent Literature Search, Malware Beaconing Detection Methods—Google Scholar, Jul. 8, 2018, 2 pages.

\* cited by examiner

| TIME | SRC | DEST | RANGE | SIZE | RANGE VALS | FILL | SPREAD | LIKELY BEACON |
|---|---|---|---|---|---|---|---|---|
| NOVEMBER 13TH 2015, 15:02:28.452 | 0.0.0.2 | 1.1.1.2 | 1 | 2,000 | 3000 | 0.004 | 5.651 | YES |
| NOVEMBER 13TH 2015, 15:02:32.783 | 0.0.0.3 | 1.1.1.3 | 1 | 500 | 2000 | 0.001 | 1.129 | YES |
| NOVEMBER 13TH 2015, 15:02:41.394 | 10.10.174.1 | 239.255.255.250 | 1 | 1,640 | 0.1 | 0 | 94.434 | NO |
| NOVEMBER 13TH 2015, 15:02:17.083 | 0.0.0.1 | 1.1.1.1 | 1 | 3,000 | 3000 | 0.006 | 5.652 | YES |
| NOVEMBER 13TH 2015, 15:02:23.029 | 192.168.54.72 | 23.235.39.223 | 1 | 36 | 0 | 0 | 0.005 | NO |
| NOVEMBER 13TH 2015, 15:02:27.255 | 10.10.174.127 | 23.235.39.133 | 1 | 36 | 0 | 0 | 0.005 | NO |
| NOVEMBER 13TH 2015, 15:02:46.000 | 0.0.0.9 | 1.1.1.9 | 1 | 1,920 | 3000 | 0.005 | 74.603 | YES |
| NOVEMBER 13TH 2015, 15:02:21.247 | 192.168.0.1 | 239.255.255.250 | 2 | 643 | 60029..60031 | 0.002 | 25.226 | YES |
| NOVEMBER 13TH 2015, 15:02:29.992 | 192.168.54.72 | 24.220.112.31 | 2 | 32 | 0.2 | 0 | 0.092 | NO |
| NOVEMBER 13TH 2015, 15:02:31.257 | 192.168.0.23 | 192.168.0.1 | 2 | 622 | 0.2 | 0 | 54.288 | NO |
| NOVEMBER 13TH 2015, 15:02:19.690 | 10.10.174.127 | 24.220.112.31 | 2 | 32 | 0.2 | 0 | 0.092 | NO |
| NOVEMBER 13TH 2015, 15:02:33.732 | 10.10.174.127 | 23.200.70.148 | 3 | 72 | 0.3 | 0 | 0 | NO |
| NOVEMBER 13TH 2015, 15:02:31.942 | 10.10.174.127 | 107.20.244.114 | 4 | 48 | 0.4 | 0 | 0.047 | NO |
| NOVEMBER 13TH 2015, 15:02:33.658 | 192.168.56.72 | 107.20.244.114 | 4 | 48 | 0.4 | 0 | 0.047 | NO |

DETECTION OF SSL / TLS MALWARE BEACONS

RELATED APPLICATION

This application claims priority to U.S. Provisional Patent Application No. 62/822,564, filed on Mar. 22, 2019, titled DETECTION OF SSL/TLS MALWARE BEACONS all of which is hereby incorporated by reference in its entirety.

A related application is U.S. patent application Ser. No. 16/362,274, filed on Mar. 22, 2019, entitled "Detection of SSL/TLS malware beacons", hereby incorporated by reference in its entirety.

FIELD OF THE INVENTION

The present invention relates to information security. More particularly, but not exclusively, the present invention relates using the number of SSL and/or TLS or other digital certificates associated with a server or other device to detect malware or otherwise provide insight into the server or other device.

BACKGROUND

Although the present invention is not limited to the detection of malware, to assist in understanding the present invention background associated with this type of information security risk is discussed. Malicious software ("Malware") includes software that is designed to gain access and/or damage a computer or subvert its functioning without the knowledge of the owner. Malware is a tremendous problem with the number of computer security incidents continuing to increase. Malware infections can have enormous direct and indirect costs on individuals, businesses and other organizations.

One type of malware is the Remote Access Trojan horse. Generally, a Trojan horse includes malware embedded in an application or system that performs or appears to perform a useful function but also is performing some form of unauthorized action. A Remote Access Trojan horse generally includes a back door for administrative access and/or control over a target computer.

Malware and Remote Access Trojan horse software which are placed on computing devices use network resources to connect back to the controller/attacker associated with the software. It is very typical for such software to be required to transmit network traffic through host, and network resident firewalls. Such firewalls have stateful mechanisms which only permit traffic to be transmitted for a specific duration of time before considering that the connection in question is no longer viable. As such, malware of this nature invariably exhibits a periodic traffic transmission behavior resembling a beacon. In order to detect this behavior, traditional network defenses have focused on a content signature approach. In the content signature approach, a characterization of what is known to be malicious is used to determine whether particular software is malicious. This characterization or model may involve significant resources (including human resources) and additional signatures may be needed whenever new instances of malware are identified. Of course, the effectiveness of content signature-based malware detection methods depend upon characterizations that may not necessarily be accurate or complete.

A further problem with malware is that some malware has evolved and now may use Transport Layer Security (TLS) and/or Secure Sockets Layer (SSL) protocols to encrypt communications. Where SSL and/or TLS protocols are used to encrypt communications, content signature-based malware detection methods are ineffective. Moreover, use of SSL and/or TLS protocols is further problematic because such protocols are widely used for web-based communications and firewalls usually allow such traffic. Allowing such traffic presents an opportunity for the malware to reach command and control (C2) channels.

Therefore, problems remain with malware detection, especially when SSL and/or TLS protocols are used to encrypt communications. What is needed are improved methods of malware detection where SSL and/or TLS protocols are used to encrypt communications.

SUMMARY

Therefore, it is a primary object, feature, or advantage of the present invention to improve over the state of the art.

It is a further object, feature, or advantage of the present invention to provide for malware detection.

It is a still further object, feature, or advantage of the present invention to provide for malware detection without needing to rely on content signature-based detection methods.

Another object, feature, or advantage is to use the periodic nature of malware beaconing to identify it as such.

Yet another object, feature, or advantage is to identify malware even when SSL and/or TLS protocols are used to encrypt communications.

A further object, feature, or advantage is to use certificates associated with SSL and/or TLS protocols to assist in malware detection or to otherwise provide insight into a server or other device and its operation.

A still further object, feature, or advantage is to use digital certificates such as those associated with SSL and/or TLS protocols or other protocols to characterize one or more servers or other sources.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

Malware detection is described which provide for the detection of malware by examining certificates associated with secure connections and determining a number of servers associated with each certificate. Malware detection is described which may further provide for the detection of malware by detecting algorithmic driven beaconing traffic from ordinary human driven network traffic. According to one aspect, a method for detecting malware beaconing in a network is provided. The method includes maintaining a database identifying a plurality of server certificates and a number of Internet Protocol addresses associated with each of the plurality of server certificates, capturing network traffic over a network connection at a network connected device, and analyzing the network traffic by determining SSL and/or TLS server certificates associated with Internet Protocol addresses associated with the network traffic and a number of servers associated with each of the server certificates wherein a greater number of servers associated with a particular one of the server certificates is indicative of less likelihood of malware beaconing. The method may include further analyzing the network traffic to determine malware beaconing, wherein the further analyzing is performed by a computing device.

According to another aspect, a method for detecting malware beaconing in a network is provided. The method may include maintaining a database identifying a plurality of server certificates and a number of Internet Protocol addresses associated with each of the plurality of server certificates, capturing network traffic over a network connection at a network connected device, representing the network traffic over the network connection as a set of tuples wherein each of the tuples defines a session and includes at least a source Internet Protocol address, a destination Internet Protocol address, and a destination port, associating timestamps with each of the set of tuples, and analyzing the tuples using the timestamps based on frequency of connections and based on a server certificate associated with the source Internet Protocol address and the number of Internet Protocol addresses associated with the server certificate to determine malware beaconing on the network, wherein the analyzing is performed by a computing device.

According to another aspect, a machine for detecting malware beaconing in a network is provided. The machine may include a network connection for connecting to the network, a non-transitory machine readable storage medium, and a hardware processor operatively connected to the network connection and the machine readable storage medium. The non-transitory machine readable storage medium may contain instructions for the hardware processor for capturing network traffic over the network connection, representing the network traffic over the network connection as a set of tuples wherein each of the tuples defines a session and includes at least a source Internet Protocol address, a destination Internet Protocol address, and a destination port, associating timestamps with each of the set of tuples, and analyzing the tuples using the timestamps based on frequency of connections and a number of Internet Protocol addresses associated with each server certificate of a server identified within the set of tuples to determine malware beaconing on the network, wherein the analyzing is performed by a computing device.

According to another aspect, a method for detecting malware beaconing in a network is provided. The method includes capturing network traffic over a network connection at a network connected device, representing the network traffic over the network connection as a defined session. The 3-tuple of source Internet Protocol address, destination Internet Protocol address, and destination TCP/UDP represents the minimum preferred data to identify an OSI communication session. The 4-tuple of source Internet Protocol address, source TCP/UDP port, destination Internet Protocol address, and destination TCP/UDP port encapsulate the client side ephemeral TCP/UDP source port selection and is a more specific alternative definition of a communication session. The method further includes associating timestamps with each of the sessions, and analyzing the sessions using the timestamps based on frequency of connections to determine malware beaconing on the network, wherein the analyzing is performed by a computing device. The analyzing the set of tuples may include performing a Fourier analysis. The Fourier analysis may be a discrete Fourier transform. The analyzing may be provided by inserting each of the connections into a time bucket based on the corresponding timestamp and inserting each duration between consecutive connections into duration buckets. Each time bucket may be stored in a time bucket hash map and each duration bucket may be stored in a duration hash map. The method may further provide for determining a smallest range of consecutive duration buckets containing T percent of all connections, wherein T is a threshold value. T may be between 80 percent and 90 percent or other appropriate range. The analyzing may further provide for determining values for a low end and a high end of the smallest range of consecutive duration buckets containing T percent of all the connections. The analyzing may further include the step of determining a difference in time between the consecutive duration buckets, determining a spread as a difference between first and last timestamps, or otherwise determining at least one of range values, range, spread, fill, and size, or other statistical measures associated with the network traffic. The method may further include displaying to a user one or more connections identified as malware beaconing, alerting a user of the presence of malware beaconing when a measure of the network traffic exceeds a threshold associated with malware beaconing, or reconfiguring a firewall to prevent network connections to the destination address and the destination port associated with the malware beaconing. The network may include a firewall having a stateful mechanism. The method may further include identifying software containing the malware, or removing the malware from the network.

According to another aspect, a machine for detecting malware beaconing in a network is provided. The machine includes a network connection for connecting to the network, a non-transitory machine readable storage medium, and a hardware processor operatively connected to the network connection and the machine readable storage medium. The non-transitory machine readable storage medium contains instructions for the hardware processor for capturing network traffic over the network connection, representing the network traffic over the network connection as a set of tuples wherein each of the tuples includes at least a source Internet Protocol address, a destination Internet Protocol address, and a destination port, associating timestamps with each of the set of tuples, and analyzing the tuples using the timestamps based on frequency of connections to determine malware beaconing on the network, wherein the analyzing is performed by a computing device.

According to another aspect, a method for characterizing network traffic is provided. The method includes maintaining a database identifying a plurality of digital certificates and a number of Internet Protocol addresses associated with each of the plurality of digital certificates, capturing network traffic over a network connection at a network connected device, analyzing the network traffic by determining the digital certificates associated with Internet Protocol addresses associated with the network traffic and a number of Internet Protocol addresses associated with each of the digital certificates and updating the database, and characterizing at least one of the Internet Protocol addresses associated with one of the digital certificates based on the number of Internet Protocol addresses associated with the one of the digital certificates. The method may further include performing an action based at least partially on the number of Internet Protocol addresses associated with the one of the digital certificates. The characterizing may include characterizing the at least one Internet protocol addresses as a security threat. The action may include blocking network traffic associated with the at least one of the Internet Protocol addresses associated with the one of the digital certificates. The method may further include representing the network traffic over the network connection as a set of tuples wherein each of the tuples defines a session and includes at least a source Internet Protocol address, a destination Internet Protocol address, and a destination port. The method may further include associating timestamps with each of the set of tuples and analyzing using a computing device the tuples using the timestamps based on frequency of connections and based on the certificates associated with the source Internet Protocol address and the number of Internet Protocol addresses associated with the server certificate. The analyzing the set of tuples may be performed using a Fourier analysis such as a discrete Fourier transform. The characterizing may include characterizing the at least one of the Internet Protocol addresses as being associated with malware beaconing. The action may include displaying to a user the at least one Internet Protocol addresses associated with the malware beaconing. The action may include reconfiguring a firewall to prevent network connections to the at least one of the Internet Protocol addresses. The characterizing may include characterizing the at least one Internet protocol addresses as not being associated with an Internet of Things (IoT) device. The characterizing may include characterizing the at least one Internet protocol addresses as potentially being associated with an Internet of Things (IoT) device. The certificates may include secure sockets layer (SSL) server certificates and/or transport layer security (TLS) server certificates.

According to another aspect, a machine for monitoring network traffic in a network is provided. The machine includes a network connection for connecting to the network, a non-transitory machine readable storage medium, and a hardware processor operatively connected to the network connection and the machine readable storage medium. The non-transitory machine readable storage medium contains instructions for the hardware processor for maintaining a database identifying a plurality of digital certificates and a number of Internet Protocol addresses associated with each of the plurality of digital certificates, capturing network traffic over a network connection at a network connected device, analyzing the network traffic by determining the digital certificates associated with Internet Protocol addresses associated with the network traffic and a number of Internet Protocol addresses associated with each of the digital certificates and updating the database, and characterizing at least one of the Internet Protocol addresses associated with one of the digital certificates based on the number of Internet Protocol addresses associated with the one of the digital certificates. The non-transitory machine readable storage medium may contain instructions for the hardware processor to perform an action based at least partially on the number of Internet Protocol addresses associated with the one of the digital certificates. The characterizing may include characterizing the at least one Internet protocol addresses as a security threat. The action may include blocking network traffic associated with the at least one of the Internet Protocol addresses associated with the one of the digital certificates. The characterizing may include characterizing a likelihood that the at least one Internet protocol addresses is associated with an Internet of Things (IoT) device. The digital certificates may include at least one of secure sockets layer (SSL) server certificates and transport layer security (TLS) server certificates

DETAILED DESCRIPTION

Methods, systems, and apparatus are provided for malware detection through distinguishing algorithmic driven beaconing traffic associated with malware from ordinary human driven network traffic. This may be accomplished by converting a representation of traffic from the time domain to the frequency domain.

As previously explained many different types of malware report back to an attacker or "call home" especially with command and control (C2) channels. The malware reports back with a beacon message. The malware may allow or enable communications for C2 messages and results. Thus the attacks can be run remotely by the attackers. Thus commands are transferred to malware infected machines, the machines execute the commands, and results are returned to the attacker. The attacker may use commands to perform any number of different activities such as, but not limited to, exploring networks to identify vulnerabilities and high value machines, infect other machines, take part in a coordinated attack, execute programs, record user activity, copy data including valuable intellectual property, and other activities. After results are returned, the process generally repeats with additional commands sent, the commands executed by compromised machines, and the results returned.

There are various other challenges associated with C2 channels. For example, compared to normal traffic, command and control messages are relatively small and the channels used are ordinary and common such as HTTP, HTTPS, email, chat, DNS, and other channels frequently used by a network's users. Of particular interest here is HTTPS where SSL or TLS is used. Computers on a network will make connections using SSL/TLS. The most common example is HTTPS but there are other protocols that use SSL/TLS to secure their transport that would apply as well. Where SSL or TLS is used, generally a public key certificate is created for the server(s). This certificate is signed by a trusted certificate authority (CA). The CA certifies that the certificate holder is the operator of the server(s) that use the certificate. Various types of certificates exist including those with extended validation. Generally, the exchange of digital certificates is performed during a SSL or TLS handshake. Each connection will have a server certificate associated with the server that the client connects to. This certificate is tied to one or more domain names. A single domain may resolve to several different IP addresses, but all of these IPs would share the same server certificate. The count for a given certificate would be the number of IPs observed hosting that certificate. Widely used websites with significant traffic will have more than one IP address which uses a given certificate due to performance and load balancing. In contrast, small websites with little traffic and attackers would likely have a count of one (1). Thus, as a part of the methodology, the number of times a SSL or TLS certificate is used on different server IPs is counted. Where a high number of IP addresses are used with a particular server certificate, there is less likelihood that the server is associated with malware beaconing. Where there only a single IP address associated with a server certificate there is a greater likelihood that the server is associated with malware beaconing. Thus, this information can be combined with other information indicative of malware beaconing in order to more effectively identify sources of malware beaconing, reduce or eliminate false identifications of malware beaconing, and/or to identify sources of malware beaconing with less computationally intensive operations than potential alternatives.

In addition, the determination of the number of IP addresses associated with a particular digital certificate may provide other insights. For example, a single IP address associated with a digital certificate may be indicative that the single IP address is associated with an internet-of-things (IoT) device. IoT devices are known to often lack proper security and are known to be susceptible to high-jacking. For example, hackers may highjack a number of IoT devices in order to use them in a distributed denial-of-service (DDoS) attack. A DDoS attack is a malicious attempt to disrupt normal traffic of a targeted server, service, or network by overwhelming the target or its associated infrastructure with a traffic from multiple sources beyond the capabilities of the target.

Thus, the number of IP addresses associated with a particular digital certificate can provide useful information which may be used to characterize the source of the traffic. Thus where a number of IP addresses are associated with a particular certificate this may be used to characterize those IP addresses as trustworthy or having a higher likelihood of trustworthiness. Where a single IP address is associated with a particular certificate this may be used to characterize that IP address as potentially less trustworthy. Similarly, a single IP address associated with a particular certificate may be indicative of a higher likelihood the device is an IoT device where a greater number of IP addresses associated with a certificate may be indicative of less likelihood that a device associated with one of these IP addresses is an IoT device. These characterizations need not be absolute and may involve probabilities or likelihood which may be qualitative or quantitative in nature. These characterizations may be combined with other insights and observations regarding the network traffic such as the volume of network traffic from these IP addresses, the frequency of these connections, or other information. Of course, other types of characterizations are contemplated and these characterizations may evolve as network traffic evolves or network attacks evolve.

For example, as explained previously malware typically reports back at predefined intervals. One of the reasons for this is the presence of stateful firewalls. A stateful firewall is a type of firewall that attempts to track the state of network connections when filtering packets so that only packets associated with known alive connections are allowed. If there is no traffic for a certain time period over a connection then the connection is closed. Thus, characteristics of malware used to avoid one type of security measure (the stateful firewall) can be leveraged to identify malware beaconing by converting a representation of traffic from the time domain to the frequency domain or otherwise examining the frequency of beaconing activity.

The network connections may be treated as time-varying signals and thus signal processing can be applied. Two domains may be considered. The time domain which relates to connections over time and the frequency domain which is the frequency at which the connections occur. The frequency as which the beaconing occurs can be determined through Fourier analysis such as through a Discrete Fourier Transform (DFFT). This allows for the transformation of signals from the time or spatial domain to the frequency domain.

Beaconing activity associated with malware is detectable when viewed in the frequency domain because the beaconing activity happens at regular intervals which is in contrast to the random manner in which most users interact.

Figure 1:
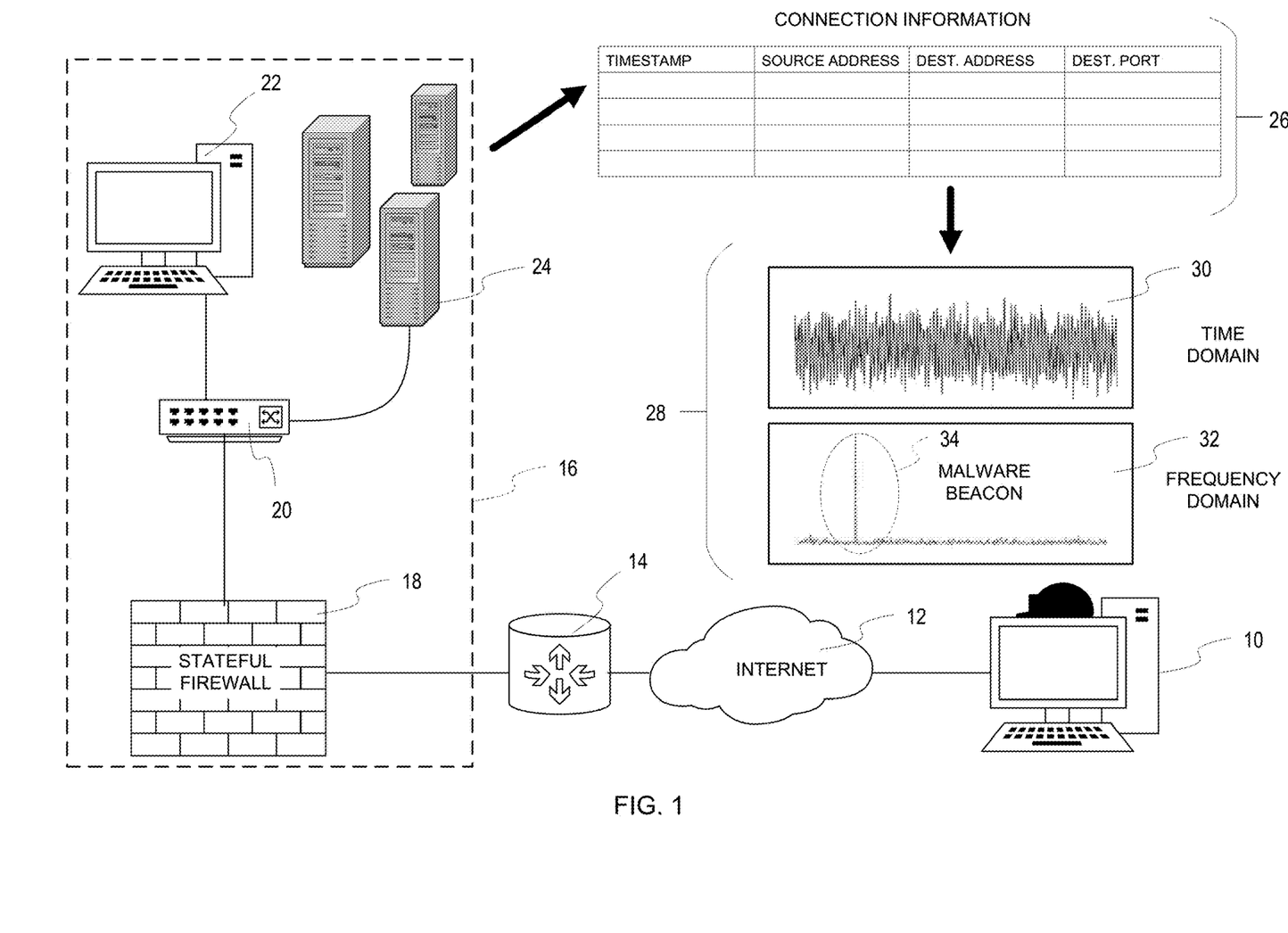
FIG. 1 is a pictorial representation of one aspect of the invention which provides for malware detection by distinguishing algorithmic driven beaconing traffic

FIG. 1 illustrates one example of the malware beaconing detection. As shown in FIG. 1, there is a machine associated with a remote attacker 10. The remote attacker 10 is operatively connected through the internet 12 or other network, through a router 14, and through a stateful firewall 18 associated with a network 16 to a network switch 20. Various machines including machine 22 and servers 24 are operatively connected to the switch as well. Note that the network shown in FIG. 1 is merely one example of a simplified network topology for explanatory purposes. Any number of different network topologies may be used. Connection information 26 from one or more devices on the network such as machine 22, servers 24, switch 20, or any number of other network devices having a network connection. The connection information may include timestamp information, source address information, destination address information, and a destination port. The network connections may be considered time varying signals as shown in the data analysis 28. The analysis allows for the transformation of the signals from the time domain 30 to the frequency domain such as through Fourier analysis or otherwise to provide frequency domain information 32. Once in the frequency domain, a malware beacon 34 is recognizable such as by recognizing that its amplitude exceeds a threshold.

Traffic may be represented using the unique 4-tuple properties (at least a 3-tuple minimum) of a network connection. Specifically for the Open Systems Interconnection (OSI) layer 4 Transport Control Protocol (TCP), and User Datagram Protocol (UDP), a unique connection stream is defined as the 4-tuple of source IPv4/IPv6 address, destination IPv4/IPv6 address, source and destination TCP/UDP port. Note that there may be particular reasons why a 3-tuple representation of a network session may be preferred over a 4-tuple and vice versa. The 3-tuple representation of a communication session is not as precise, however the fixed destination OSI layer 4 TCP/UDP port is often a fixed value whereas the 4-tuple representation which includes the source TCP/UDP port usually includes a randomly chosen source port in the (16-bit) representable range above the 1024 or 49152 value. Malware may sometimes choose a fixed source TCP/UDP port value, and/or may sometimes choose an ephemeral value depending on implementation and need to blend in with other normal looking traffic.

Traffic may be examined in either real time, or offline using the well accepted standard packet capture (PCAP) file format or other type of format. Connection frequency may be examined over time using the internal network source address as a trigger for measuring communication initiation over a time period. Statistical frequency analysis may be performed across the unique connection stream to determine the traffic initiated per second. The resulting dataset is then converted from the time base domain to a frequency domain using a Discrete Fast Fourier Transform (DFFT). The resulting frequency domain datasets may then be plotted in graphical form for visual analysis. Because a malware beaconing behavior is algorithmically driven, it usually has a very regular period such as one beacon transaction per second in an idle state, for example. This behavior is difficult to distinguish from other client station initiated traffic however after the DFFT transform is applied, any long term regular beaconing traffic is displayed as high frequencies with associated sub-harmonics and becomes statistically significant in the resulting datasets.

It is to be understood that various alternatives may be used as opposed to using a Discrete Fast Fourier Transform (DFFT). These may include any number of other examples of Fourier-related transforms for transformations from the time domain to the frequency domain and other alternative methodologies.

It is also to be understood that instead of merely visually displaying the malware beaconing activity, any number of actions may be taken. This may include alerting an administrator or other user of the presence of the malware beaconing activity, re-configuring a firewall such as to block packet activity associated with the malware beacon, identifying software associated with the malware beaconing activity such as by identifying processes executing on a malware infected machine, removing the malware, quarantining one or more infected machines, or other actions such as may be known.

Figure 2:
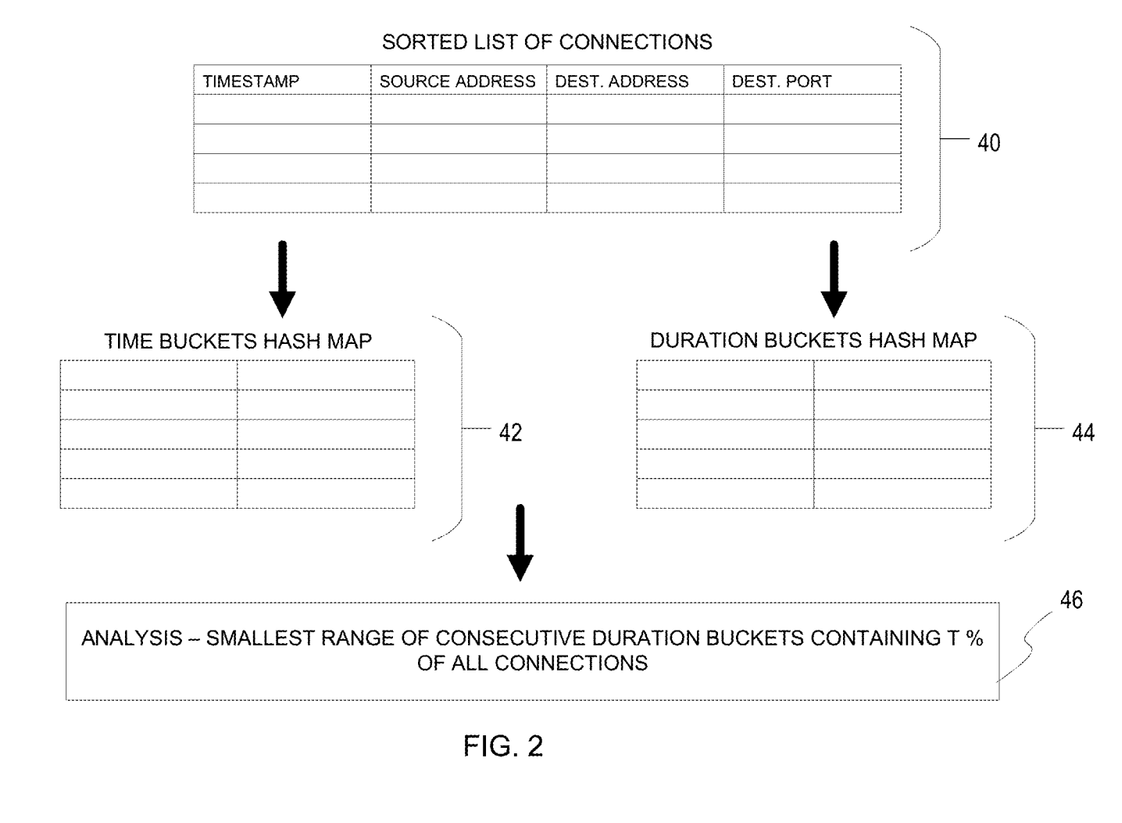
FIG. 2 illustrates another example of an algorithm for use in malware detection.

According to another algorithm, a sorted list of connections for a unique tuple (source IP address, destination IP address, and destination port) is provided along with a timestamp. This sorted list may be obtained in various ways such as from a network device connected to a network. FIG. 2 illustrates a sorted list of connections 40. As shown in FIG. 2, each connection is inserted into a time bucket based on the timestamp. The resulting time buckets are stored as a hash map 42 and the keys may be determined by dividing the timestamp by the size of the bucket in milliseconds. For example, a timestamp of 16 with bucket size 5 would go into bucket 16/5=3. Although this is a convenient and efficient method to determine which bucket to place a timestamp in, the same result may be accomplished in other ways through other calculations or application of logic as may be appropriate or desirable in a particular implementation.

Next, the duration is inserted between consecutive connections into duration buckets. The resulting duration buckets may be stored in a hash map 44 with the duration in milliseconds between connections as the key.

After creating both sets of buckets, an analysis 46 may be performed. The analysis may begin by determining the smallest range of consecutive duration buckets that contains T % of all connections is determined. For purposes here, T is a threshold value set between 80 and 90 percent, although other ranges may be contemplated as may be appropriate in particular situations based on the network traffic.

Various examples of information may then be reported as a part of the analysis. The information may include, without limitation:
    Ranges values: Values on the low and high end of the range obtained in the previous bucket creation step. (milliseconds)
    Range: The difference in milliseconds between time and duration buckets obtained.
    Spread: The difference between first and last timestamps.
    Fill: The percentage of buckets filled over data set.
    Size: The number of connections.

Figure 3:
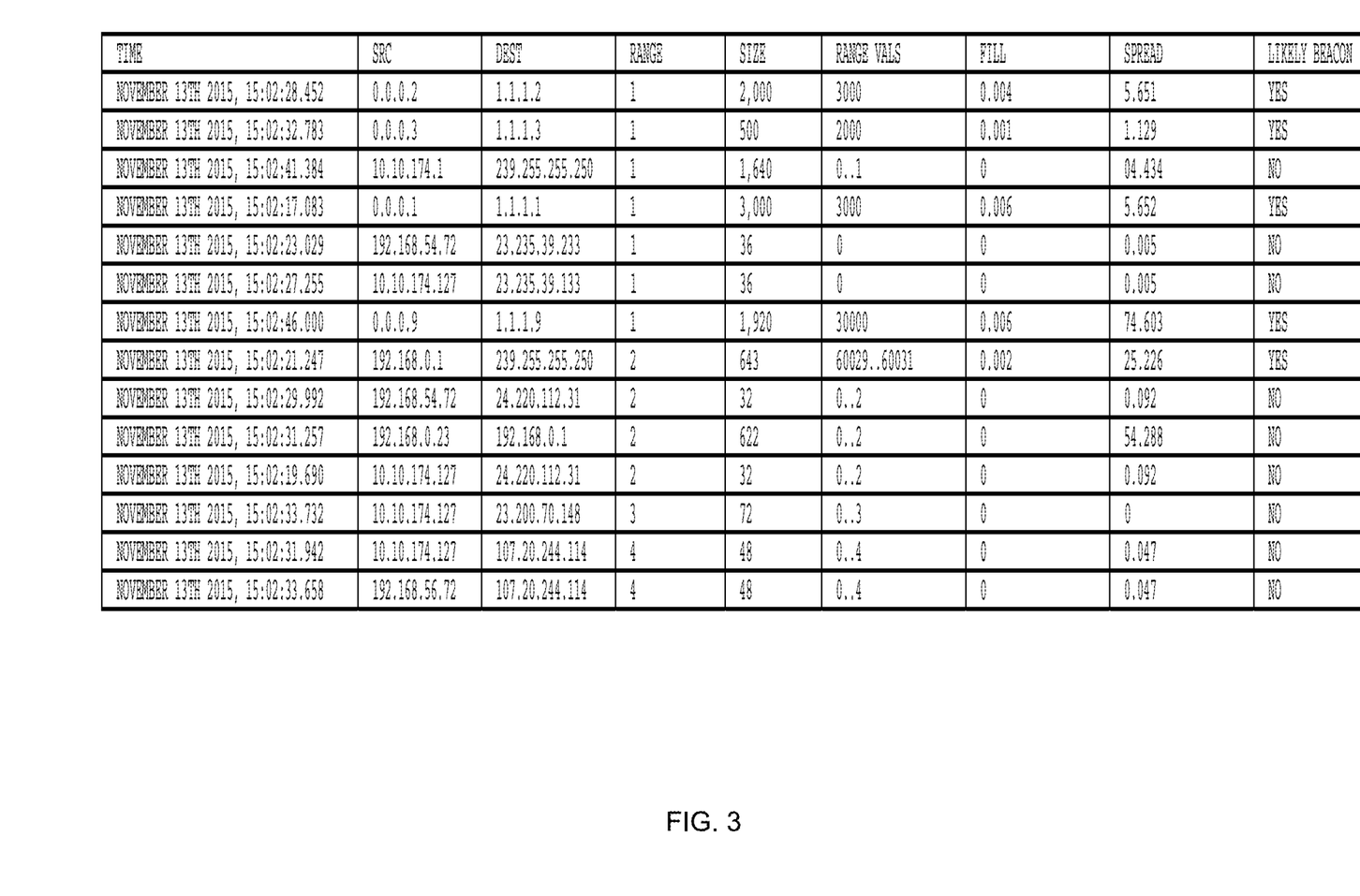
FIG. 3 is a table illustrating various measures of beaconing activity.

Each of these values may be used as a threshold to identify beaconing behavior. FIG. 3 illustrates examples of this analysis showing time stamps, source addresses, destination addresses, ranges, sizes, range values, fill percentages, and the spread. In addition a determination is shown as to whether the particular connections are identified as a beacon or not.

Of course, while the specific examples of information and range values described above may be helpful, it is contemplated that less or more information may be reported and smaller or larger ranges and different ranges may be used as may be appropriate in a particular environment or under a particular set of circumstances. Of course, other statistical measures may also be provided. In addition, it is contemplated that additional statistical information may be used such as to calculate confidence levels that particular connections are likely malware beacons or alternatively, such confidence levels may be used to assist in setting thresholds.

Thus, based on the information reported a user may determine if a malware beacon is present. The information may be reported or presented in text form (such as shown in FIG. 3) or visual form (such as shown in FIG. 1). Alternatively, or in addition, the software may alert the user of the presence of malware of the potential presence of malware when one of the values described above or other statistical value exceeds a set threshold or a malware beacon is otherwise detected.

Various software algorithms have been described throughout the Specification. It is to be understood that the various algorithms may be implemented in any number of different scripting or programming languages including Python, Perl, C, C++, Java, Ruby, R, Objective-C, or any number of other languages as may be appropriate on a particular platform, in a particular environment, or as a matter of user preference or familiarity.

Figure 4:
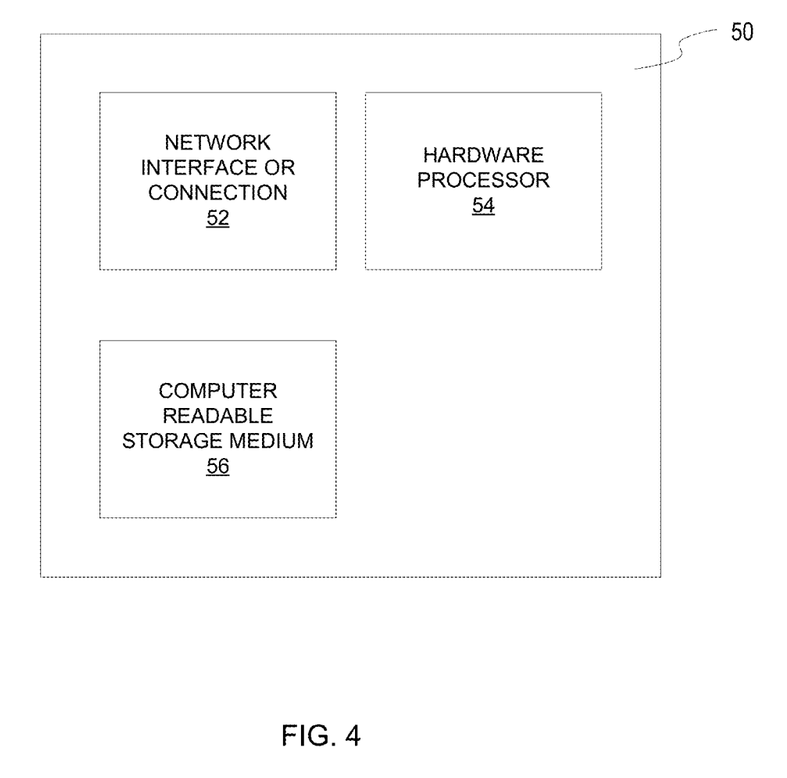
FIG. 4 illustrates one example of a machine for implementing the methodology shown and described to improve security of a network.

It should also be appreciated that various algorithms described herein may be executed by computing devices which are either off the network or on the network. For example, as shown in FIG. 4, a machine or computing device 50 is provided. The machine 50 includes a network interface or connection 52 for connecting to a network, a hardware processor 54, and a non-transitory computer readable storage medium 56. The non-transitory computer readable storage medium may contain instructions for the hardware processor 54 for performing a method. The method may include capturing network traffic over the network connection, representing the network traffic over the network connection as a set of tuples wherein each of the tuples includes at least a source Internet Protocol address, a destination Internet Protocol address, and a destination port, associating timestamps with each of the set of tuples, and analyzing the tuples using the timestamps based on frequency of connections to determine malware beaconing on the network. The machine or computing device 50 may be a network security device which performs other functionality, a standalone network security device, or other computing device.

Figure 5:
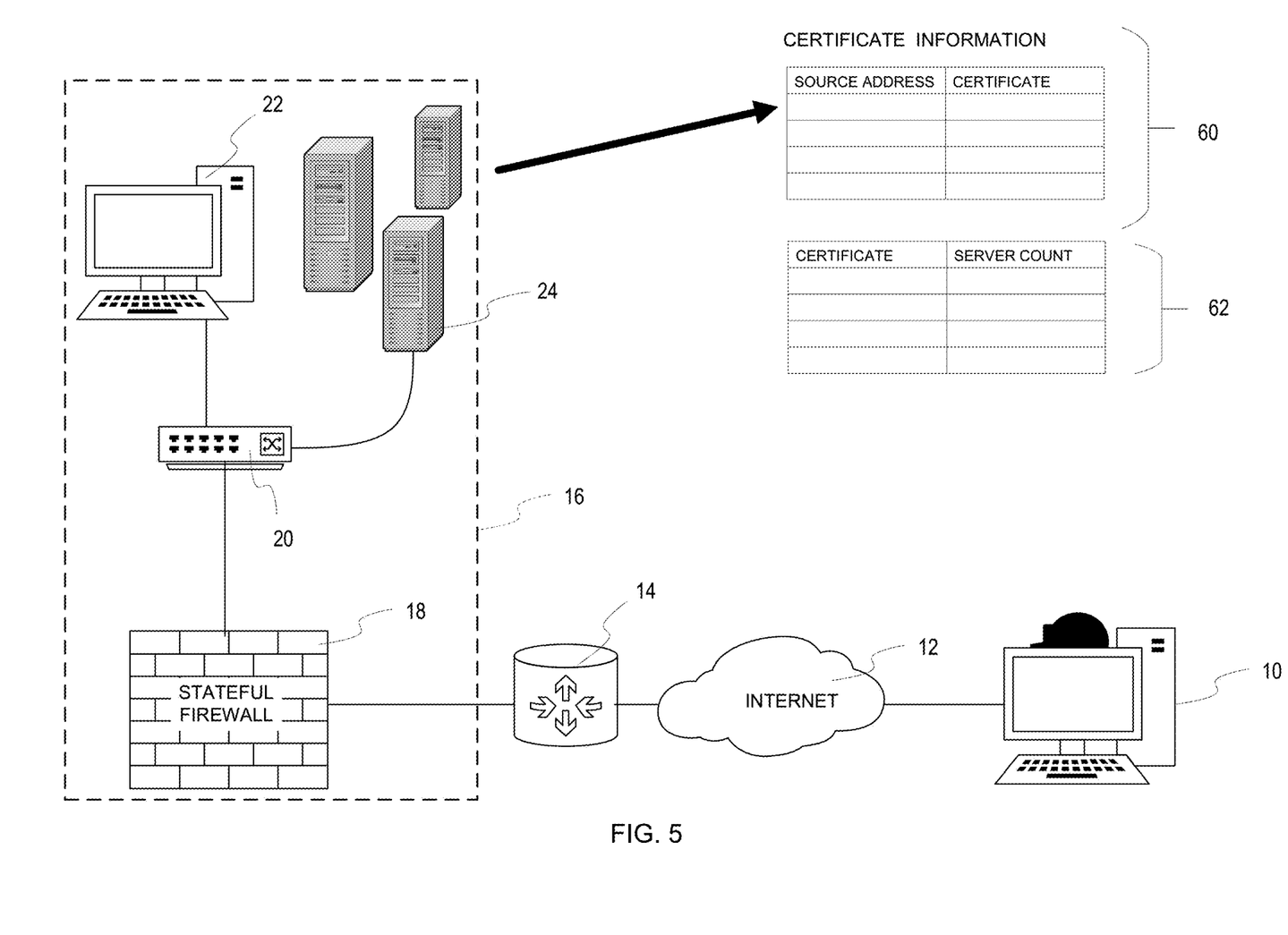
FIG. 5 illustrates one example of the malware beaconing detection where certificate information is used.

FIG. 5 illustrates one example of the malware beaconing detection where certificate information is used. As shown in FIG. 5, there is a machine associated with a remote attacker 10. The remote attacker 10 is operatively connected through the internet 12 or other network, through a router 14, and through a stateful firewall 18 associated with a network 16 to a network switch 20. Various machines including machine 22 and servers 24 are operatively connected to the switch as well. Note that the network shown in FIG. 5 is merely one example of a simplified network topology for explanatory purposes. Any number of different network topologies may be used. Connection information from one or more devices on the network such as machine 22, servers 24, switch 20, or any number of other network devices having a network connection may be collected as shown and described in FIG. 1.

In addition, or as an alternative, digital certificate information may be collected. Certificate information may be stored within a database associated with one or more servers 24 or may otherwise be stored within the network. In some embodiments such information may be stored in a cloud-based storage system accessible over the internet 12. The certificate information may include certificate data such as shown in certificate data tables 60 and 62 which may be a part of the database. For example, as shown in table 60 network address information is shown along with certificate identifying information. Thus, for a given certificate a determination may be made as to which servers (as identified with a network address or otherwise) are associated with the certificate. Certificates may be identified in various ways.

Similarly, as shown in table 62, for each certificate a count of the number of servers associated with the particular server may be shown. The count of the number of servers associated with the particular server is of interest in that it can help identify malware beaconing by assisting in identifying in potential sources of malware beaconing such as identifying instances where only a single server is associated with a particular certificate or identifying where malware beaconing is less likely because many different servers are associated with a particular certificate.

Similarly, the number of servers, machines, or IP addresses associated with a particular certificate may also be indicative as to whether or not each of the IP addresses is associated with an IoT device. Thus, for example, a single IP address associated with a certificate may indicate a higher likelihood that the IP address is associated with an IoT device while many IP addresses associated with a certificate may indicate less likelihood that the IP address is associated with an IoT device. It is to be understood that these likelihoods may be quantitative or qualitative in nature and may be combined with other information such as frequency of connections, timing of connections, network traffic or other information in order to provide additional insights. These characterizations may be stored in the database or otherwise stored or communicated.

It is to be understood that information shown in tables 60, 62 is only representative. Additional information may be present in these tables. In addition, for example, the server count for a particular certificate may be determined directly from information such as that shown in table 60 and thus table 62 would not be needed. Where certificate information is used, sufficient information should be accessed or maintained to indicate the number of servers associated with a particular certificate. It should be further understood that one or both of the data tables 60, 62 may form a database and that other information may also be present in the database related to the servers, the certificates, connections, the network, or the network connections.

It should be further understood that there are different types of digital certificates. These may include domain-validated certificates or other types of low assurance certificates. These may further include organization-validated certificates or high assurance certificates. These may further include extended validation (EV) certificates which may involve additional or more rigorous validation such as to ensure that a particular business associated with the domain exists and provide proof of ownership of the domain by the business.

It is to be further understood that in addition to determining how many servers are associated with a particular certificate, additional information about the certificate may be used in determining malware beaconing such as the type of certificate, the certificate authority, or other certificate information. Further whether the certificate is a single-name certificate, a wildcard certificate, or multi-domain certificate may be used.

It is to be further understood that any number of actions may be taken in response to characterizations made. These actions may include blocking traffic of these IP addresses, providing alerts to administrators or others regarding traffic using these IP addresses, or other types of actions.

Therefore, various methods, apparatus, and systems have been shown and described for improving information security be detecting beaconing behavior associated with malware. Although specific algorithms and methods have been described, it is contemplated that numerous variations and alternatives may be used as would be apparent to one skilled in the art having the benefit of this disclosure.

What is claimed is:

1. A method for characterizing network traffic, the method comprising:
   maintaining a database identifying a plurality of digital certificates and a count of a number of Internet Protocol addresses associated with each of the plurality of digital certificates;
   capturing network traffic over a network connection at a network connected device;
   analyzing the network traffic by determining the digital certificates associated with Internet Protocol addresses associated with the network traffic and the count of the number of Internet Protocol addresses associated with each of the digital certificates and updating the database; and
   characterizing at least one of the Internet Protocol addresses associated with one of the digital certificates based on the count of the number of Internet Protocol addresses associated with the one of the digital certificates.

2. The method of claim 1, further comprising:
   performing an action based at least partially on the number of Internet Protocol addresses associated with the one of the digital certificates.

3. The method of claim 2, wherein the characterizing comprises characterizing the at least one Internet protocol addresses as a security threat.

4. The method of claim 3, wherein the action comprises blocking network traffic associated with the at least one of the Internet Protocol addresses associated with the one of the digital certificates.

5. The method of claim 2, wherein the characterizing comprises characterizing the at least one of the Internet Protocol addresses as being associated with malware beaconing.

6. The method of claim 5, wherein the action comprises displaying to a user the at least one Internet Protocol addresses associated with the malware beaconing.

7. The method of claim 2, wherein the action comprises reconfiguring a firewall to prevent network connections to the at least one of the Internet Protocol addresses.

8. The method of claim 1, further comprising:
   representing the network traffic over the network connection as a set of tuples wherein each of the tuples defines a session and includes at least a source Internet Protocol address, a destination Internet Protocol address, and a destination port; associating timestamps with each of the set of tuples; and analyzing, using a computing device, the tuples using the timestamps based on frequency of connections and based on the certificates associated with the source Internet Protocol address and the number of Internet Protocol addresses associated with the server certificate.

9. The method of claim 8, wherein the analyzing the set of tuples comprises performing a Fourier analysis.

10. The method of claim 9, wherein the Fourier analysis is a discrete Fourier transform.

11. The method of claim 1, wherein the characterizing comprises characterizing the at least one Internet protocol addresses as not being associated with an Internet of Things (IoT) device.

12. The method of claim 1, wherein the characterizing comprises characterizing the at least one Internet protocol addresses as potentially being associated with an Internet of Things (IoT) device.

13. The method of claim 1, wherein the certificates comprise secure sockets layer (SSL) server certificates.

14. The method of claim 1 wherein the certificates comprise transport layer security (TLS) server certificates.

15. A machine for monitoring network traffic in a network, the machine comprising:
a network connection for connecting to the network;
a non-transitory machine readable storage medium; and
a hardware processor operatively connected to the network connection and the machine readable storage medium;
wherein the non-transitory machine readable storage medium contains instructions for the hardware processor for maintaining a database identifying a plurality of digital certificates and a count of a number of Internet Protocol addresses associated with each of the plurality of digital certificates, capturing network traffic over a network connection at a network connected device, analyzing the network traffic by determining the digital certificates associated with Internet Protocol addresses associated with the network traffic and a count of a number of Internet Protocol addresses associated with each of the digital certificates and updating the database, and characterizing at least one of the Internet Protocol addresses associated with one of the digital certificates based on the count of the number of Internet Protocol addresses associated with the one of the digital certificates.

16. The machine of claim 15, wherein the non-transitory machine readable storage medium contains instructions for the hardware processor for performing an action based at least partially on the number of Internet Protocol addresses associated with the one of the digital certificates.

17. The machine of claim 16, wherein the characterizing comprises characterizing the at least one Internet protocol addresses as a security threat.

18. The machine of claim 16, wherein the action comprises blocking network traffic associated with the at least one of the Internet Protocol addresses associated with the one of the digital certificates.

19. The machine of claim 16, wherein the characterizing comprises characterizing a likelihood that the at least one Internet protocol addresses is associated with an Internet of Things (IoT) device.

20. The machine of claim 16, wherein the digital certificates comprise at least one of secure sockets layer (SSL) server certificates and transport layer security (TLS) server certificates.

\* \* \* \* \*